United States Patent

[11] 3,549,104

[72] Inventors Robert D. Morrow
Baltimore, Md.;
Andrew S. Hegeman, Glen Ridge, N.J.
[21] Appl. No. 677,259
[22] Filed Oct. 23, 1967
[45] Patented Dec. 22, 1970
[73] Assignee Par, Ltd.
Clifton, N.J.
a partnership of New Jersey

[54] TAPE TRANSPORT MECHANISM
4 Claims, 3 Drawing Figs.

[52] U.S. Cl. .... 242/209, 226/94, 226/170, 226/199; 242/76
[51] Int. Cl. .... B65h 17/24; G11b 15/26, G11b 15/60
[50] Field of Search .... 242/55.12, 55.13, 55.14, 76, 206, 209, 210; 226/94, 170, 171, 172, 196, 199

[56] References Cited

UNITED STATES PATENTS

| | | | |
|---|---|---|---|
| 2,576,882 | 11/1951 | Koole et al. | 226/94X |
| 3,057,529 | 9/1962 | Fitch | (226/170UX) |
| 3,145,893 | 8/1964 | Anderson | 242/55.12X |
| 3,185,403 | 5/1965 | Bean | 226/94X |
| 3,220,666 | 11/1965 | Phillips et al. | 242/76 |
| 3,222,003 | 12/1965 | Guerth | 242/55.14(P) |
| 3,244,341 | 4/1966 | Gilman | (226/171UX) |
| 3,270.936 | 9/1966 | Selsted et al. | 242/76X |

*Primary Examiner*—George F. Mautz
*Attorney*—James B. Eisel

ABSTRACT: The tape in a magnetic tape recorder is driven by a belt, wider than the tape, that is looped around a driving wheel and a follower wheel. Tape leaving the supply reel is guided by a guide post onto the surface of the belt, where it is maintained by electrostatic attraction as the belt both supports the tape and drives it past the transducing heads. The tape is then separated from the belt and guided by another guide post onto the takeup reel.

Electrostatic charge is applied to the belt at a point prior to its receiving the tape, and excess electrostatic charge is removed from the tape before it is wound up on the takeup reel. A convenient height adjustment on the guide posts makes it easy to adjust the position of the tape transversely of the transducing heads.

PATENTED DEC 22 1970 3,549,104

*INVENTORS*
ROBERT D. MORROW
ANDREW S. HEGEMAN

TAPE TRANSPORT MECHANISM

BACKGROUND OF THE INVENTION

This invention related to tape transport mechanisms, i.e., to the mechanical arrangements for handling tapes, usually magnetic recording tapes, in a tape recorder. Tape transports include basically tape supply and takeup reels and means for unwinding tape from the supply reel, guiding it past one or more transducing heads where intelligence in the form of electrical signals is magnetically impressed upon the tape (recording head) or where the intelligence magnetically stored on the tape is transformed into appropriate electrical signals (playback head), and then winding up the tape on the takeup reel.

The improved tape transport mechanism was developed to solve a problem that arose in the design of video magnetic tape recorders suitable for the recording and playback of television programs in the home.

Video (television) recording and playback requires the storage on and retrieval from the recording medium of large amounts of intelligence per unit of time. This means that in video magnetic tape recording the tape must be run past the recording or playback head at very high speeds compared to those used in audio tape recording, since the amount of information that can be stored per unit of tape length is limited. This uses a lot of tape for a given recording time and necessitates the use of vary large (compared to audio tape recording) supply and takeup reels to accommodate the amount of tape required for useful program recording and playback.

For studio equipment, such large reels may be acceptable, but a practical television tape recorder for home use must be of moderate size and therefore must use moderately sized reels. The requirement of longer program capability for a given bulk of magnetic tape has given impetus to the development of thinner base materials on which the magnetic oxide is coated. Very thin magnetic recording tapes, having base material or backing thicknesses of 1.0 mil and even 0.5 mil, are now available. Some home video recording allows substantially slower tape speeds than studio video recording, it has been possible by the use of these thinner tapes to design a home video recorder of practical size that will record (and playback) for a practical length of time, i.e., the one-half hour interval occupied by most standard programs. For example, moderately sized 7-inch reels will accommodate 4800 feet of 0.5 mil tape, sufficient for an uninterrupted 32-minute recording at a tape speed of 30 inches per second.

Use of these very thin tapes, however, intensifies a problem inherent in all tape handling systems, i.e., the problem of maintaining a stable "tape line." Specifically, tape is tensioned to provide smooth transfer from supply to takeup reel and maintain proper contact of the magnetic oxide tape surface with the record and playback heads. In the development of the home video recorder referred to above, it was found that, when 0.5 mil tape was pulled past a recording or playback head at a speed of 30 inches per second, frictional forces generated thereby caused the tape to vibrate in much the same manner as a violin string vibrates when the instrument is bowed. These vibrations introduced unwanted oscillations into either the magnetic impressions on the tape or the electrical signals taken from the tape, depending upon whether the machine was being used to record or playback. These distortions show up in the video signal as time displacement error in picture synchronization and in low frequency amplitude modulation of the signal.

The tape transport described herein provides a solution to that problem; it effectively prevents the occurrence of the undesirable vibrations. While this tape transport was developed as a solution to the particular problem described above that arose in connection with a video tape recorder for home use, the invention is clearly not so limited. It is useful in any type of tape recorder to prevent tape vibration as the tape is drawn across a recording or playback head.

It is therefore an object of this invention to provide a tape transport mechanism for a tape recorder that prevents vibration in the tape as it is drawn across the recording or playback head.

Proper operation of tape recorders, and particularly those employing multiple track tape, requires precise alignment of the tape with the transducing heads, in a direction transverse to the direction of tape travel. Proper adjustment of tape and head alignment or correction of any misalignment that may occur, is a tedious and time consuming process with most conventional tape recorders. It is an additional object of this invention to provide a simple and rapid method for alignment of the relative positions of the tape and transducing heads.

SUMMARY OF THE INVENTION

The above objects are accomplished broadly by providing a tape drive comprising a continuously moving belt, wider than the tape, onto which the tape is fed from the supply means and which carries the tape past the transducing heads, while at the same time supporting and cushioning the tape, and from which the tape is subsequently removed and guided to the takeup means. Tape guide means that are adjustable in height provide, in conjunction with the wide belt, means for easily adjusting the position of the tape in a direction transverse to its direction of travel.

In a particular embodiment of the invention, the belt is an endless loop of material similar to the tape material tensioned around spaced driver and follower wheels. It is maintained in tight contact with the tape by forces of electrostatic attraction, and electrostatic charge is applied frictionally to the belt before it contacts the tape and excess electrostatic charge is removed from the tape before it is fed to the takeup means. The adjustable guide means comprise posts having tape-guiding recesses and depending threaded portions that permit adjustment of the post height by threading the depending portions more or less deeply into tapped holes.

BRIEF DESCRIPTION OF THE DRAWINGS

The invention, along with additional objects and advantages thereof, may be more clearly understood by reference to the following detailed description taken in conjunction with the attached drawings, which form a part of the specification, and in which.

DESCRIPTION OF THE PREFERRED EMBODIMENT

Figure 1:
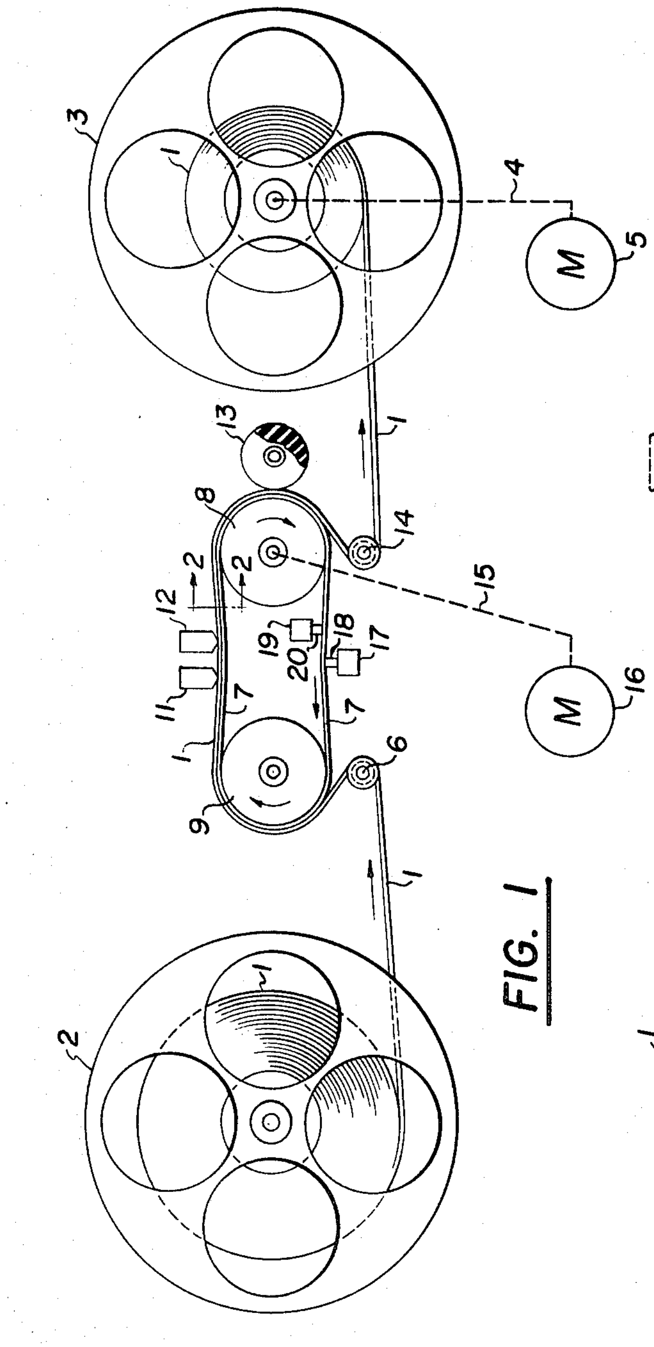
FIG. 1 is a diagrammatic plan view of one specific embodiment of the invention.

In the specific embodiment of the invention illustrated in the drawing, referring to FIG. 1, magnetic recording tape 1 is unwound from a supply reel 2, and after passing through the recording or playback process, is wound up upon takeup reel 3. Any conventional reels may be used for supply reel 2 and takeup reel 3; as mentioned above, reels with a 7-inch diameter have proven practical in a video recorder for home use. Power to wind up the tape on takeup reel 3 may be supplied in any conventional manner; the particular way in which power may be supplied to the reel does not form a part of this invention. In this embodiment, takeup reel 3 is shown diagrammatically as being driven through a mechanical linkage 4 by an electric motor 5. The takeup reel drive takes up slack as the tape is metered at constant speed through the belt driving mechanism described below.

Magnetic recording tape 1 may be any conventionally used tape, such as those having acetate or Mylar backing coated with magnetic oxide. It may be on any desired thickness, although as described above this invention was developed to enable very thin tapes to be used.

As tape 1 is unwound from supply reel 2, it passes around fixed guide post 6 and onto the outer surface of a constant speed, endless belt 7 that is tensioned around a driving wheel 8 and a follower wheel 9. While remaining in contact with the outer surface of belt 7, tape 1 is driven by the belt past recording a playback transducing heads 11 and 12 respectively. Tape 1 then makes contact with static discharge roller 13, the function of which will be described later, leaves the surface of belt 7, passes around fixed guide post 14, and is ultimately wound up upon takeup reel 3.

Playback and recording heads 11 and 12 may be any conventionally used transducing heads; their configuration does not form a part of this invention. The position of the heads with respect to each other is not important, i.e., it does not matter with these which comes first. While two heads are shown, one for recording and one for playback, one transducing head may be used to perform both functions, with appropriate switching means in the recording instrument.

Fixed guide posts 6 and 14 perform the functions respectively of guiding the tape 1 from the supply reel 2 onto the surface of belt 7, and from the surface of belt 7 onto takeup reel 3. They may be of any suitable material; stainless steel posts have been found to be satisfactory. It is not essential that fixed posts be used; their guiding function could also be performed by rollers. Details of the posts of this configuration, along with their adjustable feature, will be described below in connection with FIG. 3.

Belt 7 and driving and follower wheels 8 and 9 respectively form a tape driving and a tape supporting and cushioning system that is essentially mechanically isolated from the supply and takeup reel system. Wheels 8 and 9 preferably have a substantial mass. Brass wheels 6 inches in diameter have proven satisfactory. The material from which such wheels are made is not critical but should preferably be fairly heavy so as to provide the system with considerable inertia. The size of the wheels is not critical, although it has been found in practice that, when wheels smaller than 2 inches in diameter are used, the system becomes noticeably less effective in reducing tape vibrations.

Tape 1 is held tightly against belt 7. In the embodiment shown the means of holding the tape is the force of electrostatic attraction. The acetate or Mylar material conventionally used for tape backing is capable of maintaining a substantial electrostatic charge, and this capability is required of the belt material as well. Belt 7 may therefore conveniently be made of the same material as the tape backing, i.e., acetate or Mylar, or may be of any other flexible material having sufficient mechanical strength and capable of being electrostatically charged, such as polyethylene.

Figure 2:
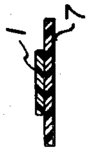
FIG. 2 is a section taken along line 2–2 of FIG. 1.

For optimum results, the belt should have a cross-sectional area at least as great as that of the tape. The belt should also be wider than the tape it supports for maximum effectiveness. This provides support for the edges of the tape and forms part of the tape adjustment feature described below. A successful combination in practice has proven to be Mylar recording tape 0.5 mil thick with a Mylar belt 1.0 mil thick and twice the width of the tape. FIG. 2 shows the position of tape 1 on belt 7 and their relative widths.

Driving wheel 8 drives belt 7 at a constant speed in a direction as indicated by the arrow on the drawing. Driving wheel 8 may be powered by any conventional means; it is shown on the drawing diagrammatically as being driven through a mechanical linkage 15 by and electric motor 16. As a practical matter, in a tape recorder the same electric motors might power both takeup reel 3 and driving wheel 8 through separate linkages.

In order to insure effective bonding of tape 1 to belt 7, the electrostatic charge normally acquired by the tape and belt is supplemented. Post 17 has attached to it a pad 18 of felt or similar material that is maintained in frictional contact with the outer surface of moving belt 7 at a point prior to its engagement with the tape. The rubbing contact between pad 18 and belt 7 charges the belt electrostatically and this charge serves to bond the belt 7 and the tape 1 tightly together once they come into contact along the periphery of follower wheel 9. In order to remove excess electrostatic charge from tape 1 before it is wound up on takeup reel 2, the tape contacts static discharge roller 13 as it passes around the periphery of driving wheel 8. Static discharge roller 13 is preferably made of hard rubber impregnated with graphite and has as its sole function the removal of the electrostatic charge from tape 1.

It has been found that, when the magnetic recording tape is tightly bound to the belt, as the belt drives it past the transducing heads, as described in detail above, vibration in the tape is effectively prevented.

Means for cleaning belt 7 may be advantageously embodied in the tape transport mechanism. Such a means is shown in FIG. 1 where a post 19 carries a cleaning pad 20 of felt or similar material positioned to make frictional contact with the inner surface of belt 7 and thereby remove dirt and foreign particles from it so as to maintain smooth operation of the belt around the periphery of wheels 8 and 9.

Figure 3:
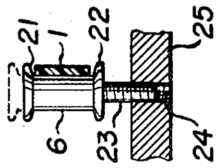
FIG. 3 is a detailed elevation of a guide post, illustrating its adjustable feature.

FIG. 3 shows the detailed structure of guide post 6, illustrating its adjustable nature which cooperates with the wide belt in providing easy transverse adjustment of the tape position. Post 6 is generally cylindrical in shape, having upper and lower annular flanges 21 and 22 respectively that define a recess or channel for accommodation of tape 1. The recess defined by flanges 21 and 22 and the cylindrical body of post 6 is advantageously just wide enough to accommodate tape 1 without binding, so that it holds the tape in a specific vertical position as viewed in FIG. 3. Depending from the main body of post 6 is a threaded portion 23 adapted to be received by tapped hole 24 in a plate or similar fixed supporting structure 25.

The height of post 6 above plate 25, and thus the vertical position of tape 1, may be adjusted by adjusting the depth to which threaded portion 23 is screwed into tapped hole 24. Post 6 may be raised, for instance, to the dotted line position in FIG. 3 from the solid line position, by simply rotating post 6 so as to unscrew it from plate 25. As the vertical position (as viewed in FIG. 3) of post 6 is adjusted, so also will the position of tape 1 be adjusted in a direction transverse to its direction of travel. The fact that belt 7 is wider than tape 1, as seen in FIG. 2, permits the position of the tape to be shifted slightly in a direction transverse to its direction of travel while still being totally supported and cushioned by belt 7 over its entire width.

While FIG. 3 is labeled as showing the structure of post 6, post 14, which guides the tape to takeup reel 3, preferably has an identical structure. It is often necessary to adjust the position of the tape with respect to the transducing heads, especially where multitrack tapes are used and 1 track alignment becomes critical for proper operation. In this transport then, this adjustment may be made quickly and easily merely by the appropriate turning of the two guide posts 6 and 14. While it is desirable for optimum tape adjustment to have both guide posts identically adjustable, it is possible to provide such tape adjustment where only one of the guide posts incorporates the adjustable structure.

While the above is a description of one preferred embodiment of the invention, there are other modifications and variations that are contemplated as being within the scope of the invention. By way of illustration and not limitation, methods other than electrostatic attraction may be used to bind the tape to the driving belt For instance, a drag may be placed on the rotation of supply reel 2, by means of a clutch, or a motor driving in the reverse direction, to tension the tape so that it is forced to lie tightly against the driving belt.

There are additionally many other variations that will suggest themselves to those skilled in the art and that are included within the scope of the invention, which is defined solely by the appended claims.

We claim:

1. In a tape transport where tape is moved at a substantially constant speed from a tape supply, past a transducing head, and to a tape takeup means, a tape drive comprising:

a. one driving wheel;

b. one follower wheel;

c. an endless flexible belt tensioned around said two wheels to form a loop driven by said driving wheel, said belt loop passing adjacent to the transducing head at a point where said belt is free of contact with the periphery of either of said two wheels, said belt being wider than the tape and having a cross-sectional area at least twice as great as that of the tape;
d. means for guiding the tape from the tape supply onto the surface of said belt before it moves past the transducing head;
e. means for guiding the tape to the takeup means from the surface of said belt after it has moved past the transducing head; and
f. said means for guiding the tape to and from the surface of said belt comprising guide posts, at least one of said guide posts having a recess for accommodating and guiding the moving tape and including means for adjusting its height whereby the position of the tape with respect to both said belt and the transducing head may be adjusted in a direction perpendicular to the direction of tape travel.

2. The apparatus of claim 1 wherein said means for adjusting the height of said guide posts comprises a threaded portion attached to each said post and adapted to be screwed into a tapped hole.

3. In a tape transport where tape is moved at a substantially constant speed from a tape supply, past a transducing head, and to a tape takeup means, a tape drive comprising:
a. a flexible belt wider than the tape and having a cross-sectional area at least as great as that of the tape;
b. means to drive said belt in such a manner that is passes adjacent to the transducing head at a point where it is mechanically unsupported;
c. means for guiding the tape from the tape supply onto the surface of said belt before it moves past the transducing head;
d. means for guiding the tape to the takeup means from the surface of said belt after it has moved past the transducing head; and
e. said means for guiding the tape to and from the surface of said belt comprising guide posts, at least one of said guide posts having a recess for accommodating and guiding the moving tape and including means for adjusting its height whereby the position of the tape with respect to both said belt and the transducing head may be adjusted in a direction perpendicular to the direction of tape travel.

4. The apparatus of claim 3 wherein said means for adjusting the height of said at least one guide post comprises a threaded portion attached to said guide post and adapted to be screwed into a tapped hole.